United States Patent
Yoon et al.

(10) Patent No.: US 10,184,778 B2
(45) Date of Patent: Jan. 22, 2019

(54) DEVICE AND METHOD FOR MEASURING THICKNESS OF SECONDARY BATTERY CELL

(71) Applicant: LG Chem, Ltd., Seoul (KR)

(72) Inventors: Du-Seong Yoon, Daejeon (KR); Su-Hyun Kim, Daejeon (KR); Ji-Hyun Kim, Daejeon (KR); Jae-Hyun Lee, Daejeon (KR)

(73) Assignee: LG Chem, Ltd. (KR)

( * ) Notice: Subject to any disclaimer, the term of this patent is extended or adjusted under 35 U.S.C. 154(b) by 10 days.

(21) Appl. No.: 15/308,893

(22) PCT Filed: Nov. 26, 2015

(86) PCT No.: PCT/KR2015/012782
§ 371 (c)(1),
(2) Date: Nov. 4, 2016

(87) PCT Pub. No.: WO2016/085271
PCT Pub. Date: Jun. 2, 2016

(65) Prior Publication Data
US 2017/0074634 A1 Mar. 16, 2017

(30) Foreign Application Priority Data

Nov. 26, 2014 (KR) .................. 10-2014-0166734
Nov. 25, 2015 (KR) .................. 10-2015-0165853

(51) Int. Cl.
*G01L 1/22* (2006.01)
*G01B 7/06* (2006.01)
(Continued)

(52) U.S. Cl.
CPC ............... *G01B 7/06* (2013.01); *G01B 7/063* (2013.01); *G01B 11/026* (2013.01); *G01L 1/16* (2013.01);
(Continued)

(58) Field of Classification Search
CPC ........ G01B 7/06; G01B 11/026; G01B 7/063; G01L 1/16; G01L 5/0028; H01M 10/48
(Continued)

(56) References Cited

U.S. PATENT DOCUMENTS 7,833,657 B2 * 11/2010 Kim .................. H01M 2/0207
429/162
9,461,280 B2 * 10/2016 Kitagawa .......... H01M 10/0404
(Continued)

FOREIGN PATENT DOCUMENTS

KR 20070035639 A 4/2007
KR 20080065822 A 7/2008
(Continued)

OTHER PUBLICATIONS

International Search Report from PCT/KR2015/012782, dated Feb. 23, 2016.

*Primary Examiner* — Jonathan Dunlap
*Assistant Examiner* — Octavia Hollington
(74) *Attorney, Agent, or Firm* — Lerner, David, Littenberg, Krumholz & Mentlik, LLP

(57) ABSTRACT

Provided are a device and method for measuring the thickness of a secondary battery cell. The device comprises: a mounting stand on which a secondary battery cell is positioned; a pressurizing plate which is installed so as to be variable in distance from the mounting stand; a pressurizing device which pushes or pulls the pressurizing plate; a measurement device for measuring the pressurization force applied to the pressurizing plate; and a controller which is configured to control charging, discharging or temperature of the secondary battery cell according to measurement conditions, receive a pressurization force measurement value and a thickness measurement value from the measurement device to thereby determine the magnitude of the pressurization force applied to the pressurizing plate and the (Continued)

thickness of the secondary battery cell, and vary, or maintain the pressurization force applied to the pressurizing plate to be constant.

17 Claims, 2 Drawing Sheets

(51) Int. Cl.
G01L 1/16 (2006.01)
G01L 5/00 (2006.01)
H01M 10/48 (2006.01)
G01B 11/02 (2006.01)
H02J 7/00 (2006.01)

(52) U.S. Cl.
CPC ........... G01L 5/0028 (2013.01); H01M 10/48 (2013.01); *H02J 7/0029* (2013.01); *H02J 7/0047* (2013.01)

(58) Field of Classification Search
USPC .......................................................... 73/818
See application file for complete search history.

(56) References Cited

U.S. PATENT DOCUMENTS

| | | |
|---|---|---|
| 2007/0154799 A1 | 7/2007 | Yoon et al. |
| 2008/0166628 A1 | 7/2008 | Kim et al. |
| 2011/0033735 A1* | 2/2011 | Kinoshita ........... H01M 10/052 429/90 |
| 2012/0208054 A1* | 8/2012 | Shirasawa ........... H01M 2/1077 429/90 |
| 2014/0178720 A1 | 6/2014 | Rentzsch et al. |

FOREIGN PATENT DOCUMENTS

| | | |
|---|---|---|
| KR | 20080074240 A | 8/2008 |
| KR | 20100018173 A | 2/2010 |
| KR | 101287411 B1 | 7/2013 |
| KR | 20140034811 A | 3/2014 |
| KR | 101397926 B1 | 5/2014 |

* cited by examiner

DEVICE AND METHOD FOR MEASURING THICKNESS OF SECONDARY BATTERY CELL

CROSS-REFERENCE TO RELATED APPLICATIONS

This application is a national phase entry under 35 U.S.C. § 371 of International Application No. PCT/KR2015/012782, filed Nov. 26, 2015, which claims priority to Korean Patent Application No. 10-2014-0166734, filed Nov. 26, 2014 and Korean Patent Application No. 10-2015-0165853, filed Nov. 25, 2015, the disclosures of which are incorporated herein by reference.

TECHNICAL FIELD

The present disclosure relates to a technology for measuring a thickness of a repeatedly chargeable and dischargeable secondary battery cell.

BACKGROUND ART

Unlike the primary battery which is not chargeable, the secondary battery is a battery that can be repeatedly charged and discharged. The secondary battery is used as a power source not only for compact and portable electronic devices such as mobile phones, PDAs, laptop computers, and so on, but also for electric vehicles or hybrid vehicles.

The secondary battery is fabricated and used in a form of a cell sealingly enclosing therein battery components such as positive electrode, negative electrode, separator, electrolyte, and a variety of additives. Meanwhile, the secondary battery may have increasing thickness of the battery cell as the chemical reaction from the repeated charging and discharging causes changing volumes of many materials including electrode active material, electrolyte, additives, and so on, generation of gas, and the like. Further, such change in the thickness of the battery cell can occur due to the heat generated during charging and discharging, the heat generated from abuse of the battery, such as over-charging, over-discharging, and so on, and also due to the heat when the battery is subject to high temperature environment.

Meanwhile, the battery cell is categorized into a can-type battery and a pouch-type battery according to the type of the case used. The can-type battery encloses the components mentioned above in a metallic rectangular or cylindrical case, and the pouch-type battery encloses the components mentioned above in a pouch consisting of a sheet with aluminum as a main material and synthetic resin coat layer laminated thereon. Although the can-type battery is physically stronger than the pouch-type battery, the pouch-type batteries are recently more widely used for relatively light weights and ease of manufacture thereof. However, due to lower physical strength, the pouch-type battery has a shortcoming that it is susceptible to the thickness change of the battery cell mentioned above.

As the thickness of the battery cell increases, that is, as the internal pressure of the battery cell increases, the battery cell can break starting from the weakest portion of the case, which may lead into accident such as fire or explosion of the battery cell. Accordingly, the pouch-type battery cell is tested by performing a predetermined number of charging and discharging cycles or leaving the cell for a predetermined time under high temperature environment, and then measuring a thickness of the battery cell to thus determine the suitability of the materials such as electrolyte, additives, and so on, and also the sealability of the pouch-type battery cell. Further, Korean Patent No. 10-1397926 discloses placing a flexible pouch-type battery cell into a vacuum chamber and measuring a thickness of the battery cell before and after the vacuum state is formed with a vacuum pump, and estimating the sites likely to have electrolyte leaks, i.e., testing sealability of the pouch-type battery cell using the difference in the thickness.

Meanwhile, the pouch-type battery cell is not used directly as in the flexible pouch form. That is, the pouch-type battery cell is either received in a hard external case to be used as a power supply battery for a portable electronic apparatus, or fabricated into a module-type battery in which a plurality of pouch-type battery cells are stacked in a hard frame for use as power storage system or as a high-capacity battery such as a power source of an electric vehicle or a hybrid vehicle. Accordingly, the pouch-type battery cell, either when it is in use or in storage, is subject to a constant pressure due to the external case or the frame. Meanwhile, in the related art, the thickness of the flexible pouch-type battery cell is measured simply in a fixed condition only. Accordingly, the related art has a limit that it cannot observe and predict changes in the thickness of the battery cell as being in actual use or in storage.

DISCLOSURE

Technical Problem

The present disclosure is designed to solve the problems of the related art, and therefore the present disclosure is directed to providing an apparatus and a method for measuring a thickness of a secondary battery cell, which are capable of measuring and predicting a change in the thickness of the secondary battery cell, or a behavior of the secondary battery cell, when the secondary battery cell is in actual use or in storage.

The present disclosure is also directed to providing an apparatus and a method for measuring a thickness of a secondary battery cell, which are capable of observing a behavior of a secondary battery cell, a case, or a cartridge frame, when the thickness change of the secondary battery cell as being in actual use or in storage is suppressed.

Technical Solution

In one aspect of the present disclosure, there is provided an apparatus for measuring a thickness of a secondary battery cell which may include a mounting stand on which the secondary battery cell is positioned for thickness measurement, a pressurizing plate opposing the mounting stand with the secondary battery cell being interposed therebetween, and being installed such that a distance to the mounting stand is variable, a pressurizing means configured to press the secondary battery cell placed on the mounting stand in a thickness direction by pushing or pulling the pressurizing plate to or from the mounting stand; a measurement means configured to measure a pressurization force applied to the pressurizing plate by the pressurizing means, and the thickness of the secondary battery cell, and a controller configured to: control charging, discharging or temperature of the secondary battery cell according to a measurement condition as inputted by an operator; be inputted with a pressurization force measurement value and a thickness measurement value from the measurement means at time intervals to determine a magnitude of the pressurization force applied to the pressurizing plate and the thickness of the secondary battery cell and store the determined data in a memory along with time information; and, while the thickness of the secondary battery cell is being measured, vary, or maintain the pressurization force applied to the pressurizing plate by the pressurizing means to be constant.

Preferably, the pressurizing means includes an elastic member installed on one of both surfaces of the pressurizing plate, opposing a surface in contact with the secondary battery cell, thereby to elastically bias the pressurizing plate, a driving block coupled with the elastic member to push or pull the elastic member in the thickness direction of the secondary battery cell, and a driving unit configured to raise or lower the driving block in the thickness direction of the secondary battery cell.

According to one aspect, the measurement means is configured to measure a distance between the driving block and the pressurizing plate and output the distance measurement value as a pressurization force measurement value, at time intervals, and the controller is configured to be inputted with the distance measurement value from the measurement means and determine a length of the elastic member, determine a magnitude of the pressurization force applied to the pressurizing plate based on the determined length of the elastic member, and store the determined magnitude of the pressurization force in a memory along with time information.

According to another aspect, the controller determines the thickness of the secondary battery cell using the length of the elastic member, a moving distance of the driving block, and an initial distance between the mounting stand and the pressurizing plate, and stores the determined thickness in the memory along with time information.

Preferably, the controller is configured to display pressurization force change data or thickness change data of the secondary battery cell stored in the memory, through a display.

According to another aspect, the measurement means may include a piezoelectric sensor disposed between a surface of the mounting stand and a surface of the pressurizing plate opposing the surface of the mounting stand, to output a thickness measurement value of the secondary battery cell.

According to another aspect, the measurement means may include a distance measuring sensor configured to emit an optical signal, an ultrasound or an infrared ray from the driving block or the pressurizing plate to measure time taken for reciprocating between the driving block and the pressurizing plate and output a distance measurement value indicative of the distance between the driving block and the pressurizing plate.

Preferably, the apparatus may additionally include a charger/discharger configured to charge or discharge the secondary battery cell. The controller may be inputted with a charging and discharging condition from the operator and store the inputted condition in the memory, and control the charger/discharger according to the charging and discharging condition such that the secondary battery cell is charged and discharged.

Further, the apparatus according to the present disclosure may additionally include a heater installed on at least one of the pressurizing plate and the mounting stand. The controller may be inputted with a heating temperature set value from the operator and store the inputted data in the memory, and control a temperature of the heater according to the heating temperature set value.

Further, the apparatus according to the present disclosure may additionally include a cooling means for cooling at least one of the pressurizing plate and the mounting stand. The controller may be inputted with a cooling temperature set value from the operator and store the inputted data in the memory, and control the cooling means according to the cooling temperature set value.

In one aspect of the present disclosure, there is provided a method for measuring a thickness of a secondary battery cell using: a mounting stand on which a secondary battery cell for thickness measurement is positioned; a pressurizing plate installed such that a distance to the mounting stand is variable, with the secondary battery cell being interposed therebetween, the pressurizing plate being elastically biased by an elastic member; a driving block configured to press the secondary battery cell positioned on the mounting stand in a thickness direction by pushing or pulling, with the elastic member, the pressurizing plate toward or from the mounting stand; and a measurement means configured to measure a pressurization force applied to the pressurizing plate and the thickness of the secondary battery cell, in which the method may include: charging or discharging the secondary battery cell or adjusting a temperature of the secondary battery cell according to a measurement condition inputted by an operator; at time intervals, being inputted with a pressurization force measurement value and a thickness measurement value from the measurement means, determining a magnitude of the pressurization force applied to the pressurizing plate and the thickness of the secondary battery cell, and storing the magnitude of the pressurization force and the thickness in a memory along with time information; and, while the thickness of the secondary battery cell is being measured, varying, or maintaining the pressurization force applied to the pressurizing plate by the pressurizing means to be constant.

Advantageous Effects

According to various exemplary embodiments, the thickness of the cell can be measured while varying pressurization force or ambient temperatures to desired magnitudes with ease, unlike the related art that measures the thickness of the cell only one time, that is, under a fixed condition (i.e., under fixed pressurization force). Accordingly, the change in the thickness of the secondary battery cell and behavior thereof can be observed under a condition close to when the secondary battery cell is in actual use or in storage. Furthermore, the change in the thickness of the secondary battery cell can be suppressed, and the behavior of the secondary battery cell, either when the secondary battery cell is in actual use or in storage, can be observed such that necessary physical strength data required for a cartridge frame or external case, or pouch can be obtained.

DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
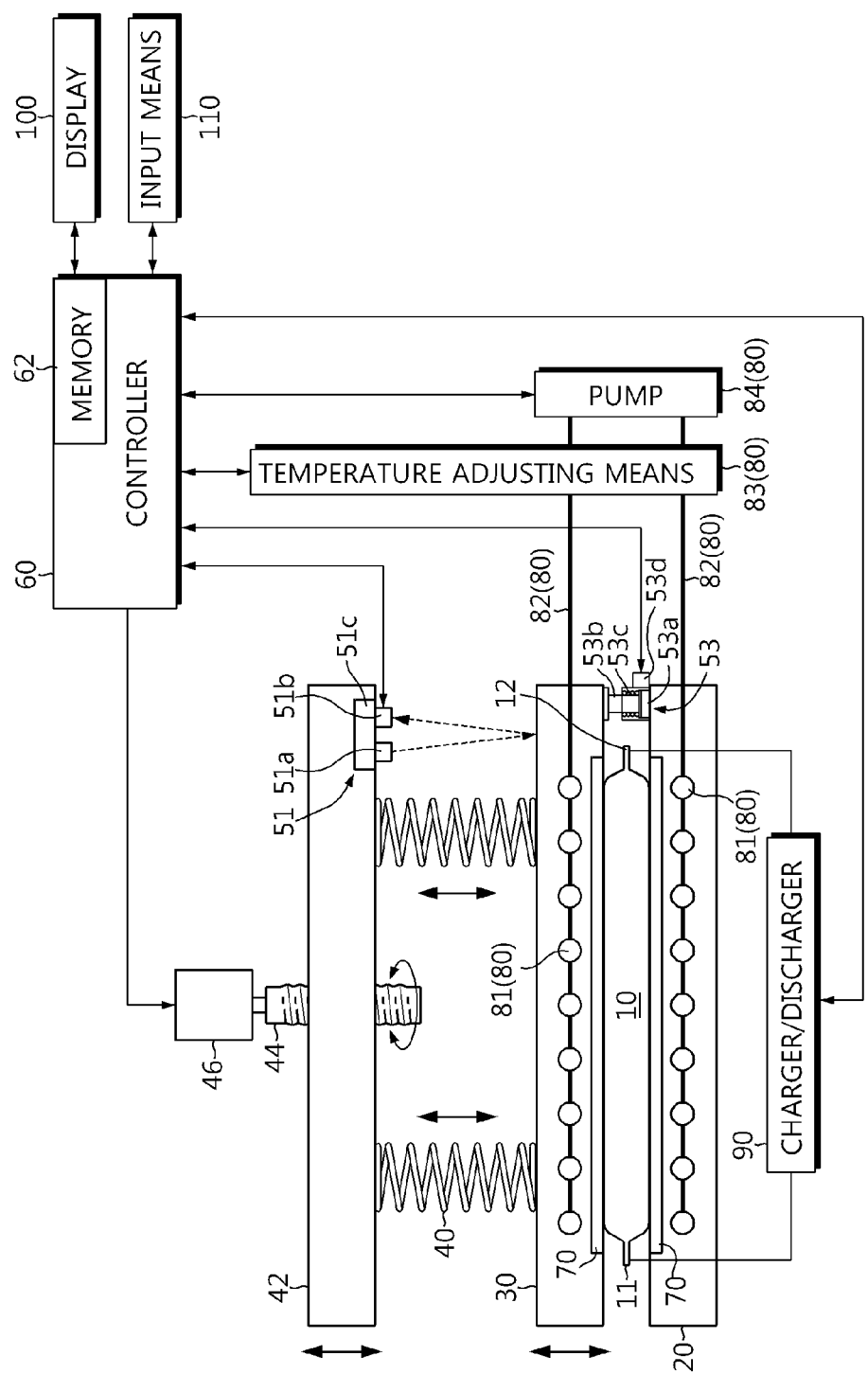
FIG. 1 schematically illustrates a configuration of an apparatus for measuring a thickness of a secondary battery cell according to an exemplary embodiment of the present disclosure.

FIG. 1 schematically illustrates a configuration of an apparatus for measuring a thickness of a secondary battery cell ('cell thickness measuring apparatus') according to an exemplary embodiment of the present disclosure.

According to an exemplary embodiment, an apparatus for measuring a thickness of a cell includes, mainly, a mounting stand 20, a pressurizing plate 30, pressurizing means 40, 42, 44, 46, measuring means 51, 53, and a controller 60.

The mounting stand 20 provides a location where an object for thickness measurement (i.e., secondary battery cell 10) is positioned, and is either fixed to a frame (not illustrated) of the cell thickness measuring apparatus or included as a part of the frame. The mounting stand 20 is formed from a material with rigidity such as a metal, a hard plastic, and so on so as not to be easily dented or deformed when the secondary battery cell 10 is expanded or pressed by the pressurizing means.

Further, the mounting stand 20 may typically take a flat plate shape, although not limited thereto. That is, when a plurality of secondary battery cells 10 are stacked with the cartridge frames being interposed therebetween to construct a module-type battery, or when one secondary battery cell 10 is positioned in a hard external case to construct a battery for supplying electric power to a portable electronic apparatus, for example, the shape of the surface of the mounting stand 20 on which the secondary battery cell 10 is positioned may be identical to the shape of the surface of the cartridge frame or the external case that faces the secondary battery cell 10.

The cell thickness measuring apparatus according to an exemplary embodiment may additionally include a sheet-type heater 70 installed inside the mounting stand 20 and the pressurizing plate 30 to simulate an environment in which the secondary battery cell 10 is in use or in storage. Of course, the sheet-type heater 70 may be installed on any one of the mounting stand 20 and the pressurizing plate 30. The heater 70 adjusts a temperature of the secondary battery cell 10 to a temperature as set by an operator according to control command from the controller 60. The heater 70 is installed close to the surfaces of the mounting stand 20 and the pressurizing plate 30, and has an area corresponding to at least the size of the secondary battery cell 10.

The cell thickness measuring apparatus according to an exemplary embodiment may additionally include a cooling means 80 that cools the temperature of the secondary battery cell 10 to a temperature as set by the operator. The cooling means 80 is installed on at least one of the mounting stand 20 and the pressurizing plate 30. The cooling means 30 includes a coolant flow tube 81 buried in the mounting stand 20 and the pressurizing plate 30, a circulation pipe 82 for feeding coolant to the coolant flow tube 81, a temperature adjusting means 83 in fluid communication with the circulation pipe 82 and decreasing the temperature of the coolant to a temperature as set by the operator according to a control signal from the controller 60, and a pump 84 that circulates the coolant through the circulation pipe 82 and the coolant flow tube 81 according to a control signal from the controller 60.

The cell thickness measuring apparatus according to an exemplary embodiment may additionally include a charger/discharger 90. The charger/discharger 90 charges and discharges the secondary battery cell 10 according to charging and discharging conditions as set by the operator, according to a control command from the controller 60. For example, the charger/discharger 90 may repeat the process of charging the secondary battery cell 10 to a full charge voltage and then discharging to a full discharge voltage, by a number of cycles as set by the operator. In another example, the charger/discharger 90 may charge and discharge the secondary battery cell 10 according to charge/discharge profile as set by the operator. The charge/discharge profile is the data that defines the magnitude of the charge current and discharge current according to time. The charger/discharger 90 may be used to observe changes over time in the thickness of the secondary battery cell 10, according to a charge/discharge cycle or a charge/discharge profile.

The charger/discharger 90 may include at least a voltage measuring circuit to measure the voltage of the secondary battery cell 10. The charger/discharger 90 may provide the voltage measurement value measured by the voltage measuring circuit to the controller 60. When the voltage measurement value reaches an operating lower limit voltage set by the operator, the controller 60 may provide the charger/discharger 90 with a control command to operate the charger/discharger 90 in a charge mode. In contrast, when the voltage measurement value reaches an operating upper limit voltage set by the operator, the controller 60 may provide the charger/discharger 90 with a control command to operate the charger/discharger 90 in a discharge mode. Further, the controller 60 may count the charge/discharge cycles of the secondary battery cell 10 and when the counted cycle value reaches an operator-set value, the controller 60 may stop the operation of the charger/discharger 90.

In an exemplary embodiment, the secondary battery cell 10 as a subject of the thickness measurement may advantageously be a pouch-type secondary battery cell that is somewhat flexible and also expandable and contractible, although a can-type secondary battery cell may also be applicable.

The pouch-shaped secondary battery cell 10 takes a form of a sheet with a predetermined thickness with electrode terminals 11, 12 protruding to sides, in which the battery components such as positive electrode, negative electrode, separator, electrolyte, and various other additives are sealingly received in the sheets including aluminum as a main material and synthetic resin coating layers laminated thereon. Meanwhile, while the electrode terminals 11, 12 are illustrated to protrude respectively on both side surfaces of the pouch-type secondary battery cell 10, the location and the direction of such protrusion of the electrode terminals may vary. The electrode terminals 11, 12 may be electrically connected to the charger/discharger 90.

The pressurizing plate 30 is installed opposite the mounting stand 20, with the secondary battery cell 10 interposed therebetween, and is installed on a frame (not illustrated) at a variable distance to the mounting stand 20 (i.e., in a manner of being movable upward and downward in the drawing).

Further, like the mounting stand 20, the pressurizing plate 30 may be formed from a rigid material such as metal, hard plastic, and so on, and may typically take a form of a flat plate, but the shape of the surface of the pressurizing plate 30 facing the secondary battery cell 10 may be identical to the shape of the surface of the cartridge frame or the external case that faces the secondary battery cell 10.

The pressurizing means is provided to press the secondary battery cell 10 positioned on the mounting stand 20 in a thickness direction by pushing or pulling the pressurizing plate 30 toward or from the mounting stand 20. In an exemplary embodiment, the pressurizing means includes an elastic member 40, a driving block 42, a screw 44, and a motor 46 as a driving unit.

The elastic member 40 is installed on an upper surface of the pressurizing plate 30, i.e., on a surface opposite the secondary battery cell 10 to elastically bias the pressurizing plate 30. Although there are two coil springs illustrated in the drawings as an example of the elastic member 40, it is understandable that the elastic member 40 may be composed of one coil spring or three or more coil springs. Further, the elastic member 40 may be composed of not only the coil spring, but also plate spring or other element with elasticity such as rubber.

The driving block 42 is movably installed on an upper end of the elastic member 40, i.e., on an end opposite the pressurizing plate 30 to ascend and descend to thus push or pull the elastic member 40 in the thickness direction of the secondary battery cell 10. Like the mounting stand 20 and the pressurizing plate 30, the driving block 42 may be formed from a rigid material such as metal or hard plastic, and formed into a flat plate shape, although detailed shape may be modified. A screw through hole with threads formed in an inner circumference is formed at a center of the driving block 42.

The screw 44 has threads at the same pitch as the threads formed in the inner circumference of the screw through hole such that the screw 44 is inserted into the screw through hole and screw-engaged and thus engaged with the driving block 42.

An upper end of the screw 44 is fixed at the rotational shaft of the motor 46 fixed to the frame such that the screw 44 is rotated according to the rotation of the motor 46, and the driving block 42 is raised and lowered according to the rotation of the screw 44. That is, the motor 46 is the driving unit that drives the driving block 42 to move along the thickness direction of the secondary battery cell 10. The ascending and descending movement of the driving block 42 according to the rotation of the motor 46 and the screw 44 is delivered to the pressurizing plate 30 via the elastic member 40 such that the pressurizing plate 30 presses the secondary battery cell 10 positioned on the mounting stand 20 with a predetermined pressurization force.

The motor 46 that is capable of forward and backward rotation may be used to enable ascending and descending of the driving block 42, and step motor or servo motor may desirably be used to provide precisely-adjusted pressurization force (i.e., amount of ascending/descending movement of the driving block 42).

Meanwhile, an exemplary embodiment, the screw 44 may be directly fixed to the rotational shaft of the motor 46, but not limited thereto. Accordingly, a driving force transmitting apparatus such as a gear box may be interposed between the motor 46 and the screw 44 to change the rotational speed and direction. Further, while the exemplary embodiment exemplifies the ascending and descending motion of the driving block 42 with the rotation of the motor 46 and the screw 44, other tools such as rack and pinion, worm and worm gear, and so on that converts between rotational motion and linear motion may be used. Furthermore, a motor such as linear motor that has a linear movement may also be used. Further, while the exemplary embodiment exemplifies that the motor 46 may be used as the driving unit to raise and lower the driving block 42, the present disclosure is not limited thereto. Accordingly, a knob or handle may be used instead of the motor to adjust ascending and descending of the driving block 42 such that the user can directly and manually operate the same to raise and lower the driving block 42.

The measurement means 51, 53 is provided to measure the pressurization force exerted on the pressurizing plate 30 by the pressurizing means described above and to measure the thickness of the secondary battery cell 10, and means described below may be used specifically.

First, the pressurization force exerted on the pressurizing plate 30, i.e., the force that presses the pressurizing plate 30 may be converted into elastic force of the coil spring (i.e., elastic member 40). That is, in case the elastic member 40 is a compression coil spring having an elasticity modulus of k, when the length of the spring 40 is reduced by x from a length when no force is exerted on the spring 40 in response to descending of the driving block 42, then the elastic force of the spring 40 will be F=kx and this can be used as the pressurization force. Accordingly, when the initial length of the elastic member 40 in the thickness direction of the secondary battery cell 10 is known, the pressurization force may be quantitatively measured by measuring a current length, i.e., a distance between the upper surface of the pressurizing plate 30 and the lower surface of the driving block 42.

Specifically, the means for measuring the pressurization force may be a distance measuring sensor 51 that emits an optical signal, ultrasound or infrared ray from the driving block 42 or the pressurizing plate 30, and then measures the time for reciprocating between the driving block 42 and the pressurizing plate 30 to thus output a distance measurement value indicative of the distance between the driving block 42 and the pressurizing plate 30. In this example, the distance measuring sensor 51 may output a distance measurement value as the pressurization force measurement value at time intervals.

Preferably, the distance measuring sensor 51 may include an emitting element 51a installed on a lower surface of the driving block 42 (or upper surface of the pressurizing plate 30) to emit a distance measuring signal such as laser, infrared or ultrasound toward the upper surface of the pressurizing plate 30 (or lower surface of the driving block 42), a receiving element 51b to sense the distance measuring signal reflected from the upper surface of the pressurizing plate 30 (or lower surface of the driving block 42), and a sensor driver 51c that counts the time for the distance measuring signal to reciprocate between the driving block 42 and the pressurizing plate 30 and determine a distance measurement value based on the counted time and the frequency of the distance measuring signal, and so on.

The thickness of the secondary battery cell 10 is equal to the distance between the upper surface of the mounting stand 20 and the lower surface of the pressurizing plate 30 when the secondary battery cell 10 is positioned on the mounting stand 20 and the pressurizing plate 30 are in tight contact with each other. Accordingly, in order to measure the thickness of the secondary battery cell 10, a piezoelectric sensor 53 disposed between the upper surface of the mounting stand 20 and the lower surface of the pressurizing plate 30 may be used.

The piezoelectric sensor 53 includes a piezoelectric body 53a that generates a voltage signal varying in magnitude according to pressure, a rod 53b movable in a vertical direction, an elastic body 53c that varies the pressure exerted on the piezoelectric body 53a according to the position of the rod 53b by elastically biasing the rod 53b, and a sensor driver 53d that determines a moving distance of the rod 53b according to the magnitude of the voltage signal and outputs a thickness measurement value of the secondary battery cell 10 based on the determined moving distance of the rod 53b.

The initial position of the rod 53b is higher than the thickness of the secondary battery cell 10. When the pressurizing plate 30 descends, the rod 53b is lowered down in contact with the lower surface of the pressurizing plate 30, and as the pressure is exerted on the piezoelectric body 53a through the elastic body 53c, the piezoelectric body 53a generates a voltage signal having a magnitude corresponding to the descending distance of the rod 53b. The generated voltage signal is inputted to the sensor driver 53d. The sensor driver 53d may determine the magnitude of the received voltage signal and determine the thickness measurement value of the secondary battery cell 10 using a predefined thickness equation. The thickness equation may be defined by examining the correlation between the magnitude of the voltage signal and the descending distance of the rod with experiments.

According to another aspect, the distance between the upper surface of the mounting stand 20 and the lower surface of the pressurizing plate 30 may be measured by using a distance measurement means in the same manner as the distance measuring sensor 51.

According to yet another aspect, the thickness of the secondary battery cell 10 may be calculated without having to use a separate measurement means 53, i.e., by using the distance measuring sensor 51 and the controller 60. That is, the distance measuring sensor 51 may be able to measure only the distance between the upper surface of the pressurizing plate 30 and the lower surface of the driving block 42, but if a moving distance of the driving block 42 from the initial position (i.e., the moving distance traveled by an end closer to the driving block 42 of the elastic member 40 along the thickness direction of the secondary battery cell 10) is known, the distance measuring sensor 51 will be able to calculate the thickness of the secondary battery cell 10 based on the initial distance between the upper surface of the pressurizing plate 30 and the lower surface of the driving block 42 and the moving distance of the driving block 42. This will be described in more detail below with reference to FIG. 2.

The controller 60 controls the overall operation of the cell thickness measuring apparatus. Specifically, while the thickness of the secondary battery cell 10 is being measured, the controller 60 may be inputted with the pressurization force measurement value (i.e., distance measurement value) and the thickness measurement value of the secondary battery cell 10 from the measurement means 51, 53, and controls the driving of the motor 46 such that the pressurization force is applied to the secondary battery cell 10 under the condition set by the operator.

Specifically, according to an exemplary embodiment of measuring the thickness of the secondary battery cell 10, while the thickness of the secondary battery cell 10 is being measured, the pressurization force applied to the secondary battery cell 10 is maintained constant or varied according to a predetermined pattern as set by the operator, such that the thickness of the secondary battery cell 10 is measured under the condition that is closest to the condition where the secondary battery cell is in actual use or in storage.

To this end, the controller 60 may receive, from the operator, a constant profile or a predetermined varying pattern of profile of the pressurization force applied to the secondary battery cell 10 during thickness measurement, store the received profiles in the memory 62, and read out the pressurization force value stored at the memory 62 as the measurement is in process to thus drive the motor 46 according to the preset conditions for applying pressurization force.

The controller 60 may additionally include an output device such as a display 100 to indicate the thickness measurement value of the secondary battery cell 10 and the pressurization force measurement value at that time to the user, and an input means 110 such as a mouse, a keyboard, and so on for the operator to input instructions or data.

The controller 60 may determine the magnitude of the pressurization force applied to the secondary battery cell 10 and the thickness of the cell based on the pressurization force measurement value and the thickness measurement value inputted from the measurement means 51, 53 at time intervals, and store the same with the time information into the memory 62.

Further, in response to a request from the operator, the controller 60 may use the data stored in the memory 62 to generate thickness change data of the secondary battery cell 10 according to a magnitude of pressurization force, pressurization force change data according to a thickness of the secondary battery cell 10, thickness change data of the secondary battery cell 10 according to time, or pressurization force change data according to time, and display the same on the display 100. The information displayed on the display 100 may be a graph, although the present disclosure is not limited thereto.

The operator may establish settings including conditions for applying pressurization force, whether the secondary battery cell 10 is charged or discharged, a number of charge/discharge cycles, a charge/discharge profile, a heating temperature set value or cooling temperature set value for the secondary battery cell 10, and so on. The conditions for applying pressurization force may be set to a fixed value or set to vary depending on time. Similarly, the heating temperature set value or cooling temperature set value may be set to a fixed value, or set to vary depending on time. To this purpose, the controller 60 may provide a graphic user interface through the display 100, through which various set values can be inputted.

The controller 60 including the memory 62 may be typically implemented to be an electronic circuit or chip such as a microprocessor or a memory device, although the present disclosure is not required to be provided with a memory or a controller.

In the meantime, a scale (i.e., graduated ruler) for measuring a distance (i.e., thickness of the secondary battery cell) between the mounting stand 20 and the pressurizing plate 30 and a distance (i.e., pressurization force) between the pressurizing plate 30 and the driving block 42 may be installed to a frame or the like of the apparatus such that the user may manipulate the motor 46 or the knob or handle manually by referring to the scale to adjust the pressurization force and measure the thickness of the secondary battery cell. In this example, the measurement means 51, 53 described above may be omitted.

Figure 2:
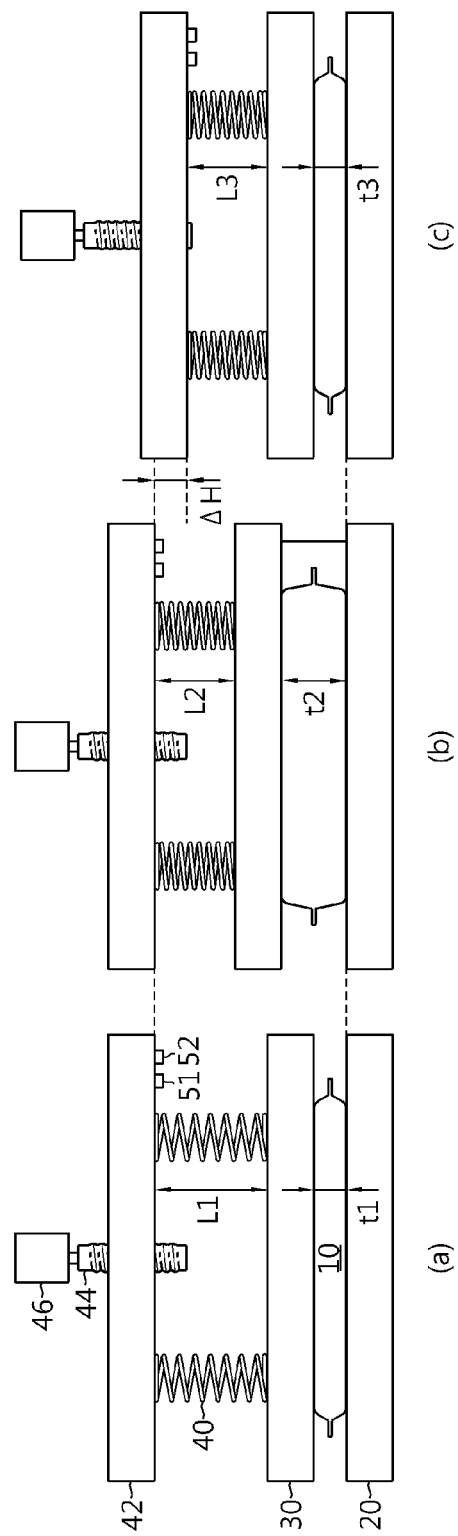
FIG. 2 is a view provided to explain a process of measuring a cell thickness, using an apparatus for measuring a thickness of a secondary battery cell according to an exemplary embodiment of the present disclosure.

FIG. 2 is a view provided to explain a process of measuring a cell thickness using an apparatus for measuring a thickness of a secondary battery cell according to an exemplary embodiment of the present disclosure. The method for measuring a thickness of the secondary battery cell according to another aspect of the present disclosure will be described below with reference to FIG. 2.

First, the pressurizing plate 30 (i.e., driving block 42) of the cell thickness measuring apparatus described above is ascended upward and the secondary battery cell 10 for thickness measuring is positioned on the mounting stand 20.

The controller 60 then lowers down the pressurizing plate 30 (i.e., driving block 42) such that the pressurization force as set by the operator is applied to the secondary battery cell 10 (see FIG. 2A).

At this time, the controller 60 may be inputted with a distance measurement value as the pressurization force measurement value from the distance measuring sensor 51 and determine a distance between the driving block 42 and the pressurizing plate 30, i.e., a length L1 of the elastic member 40. Further, the controller 60 may adjust the pressurization force by feedback-controlling the driving of the motor 46 such that the length L1 of the elastic member 40 corresponds to the pressurization force as set.

The apparatus for measuring a thickness of the secondary battery cell according to an exemplary embodiment may be used to observe the changes in the thickness of the secondary battery cell 10 and the behavior thereof while the secondary battery is in the state of being in actual use.

According to one aspect, the controller 60 may control the charger/discharger 90 so as to control charging and discharging of the secondary battery cell 10 according to the measuring conditions as set by the operator with respect to the secondary battery cell 10. The measuring conditions may include the number of charge/discharge cycles or the charge/discharge profile. In this case, while the secondary battery cell 10 is being charged or discharged, the controller 60 may determine a thickness measurement value of the secondary battery cell 10 and a measurement value of the pressurization force applied to the pressurizing plate 30, using the measurement means 51, 53 continuously or intermittently. Further, the controller 60 may store the thickness measurement value and the pressurization force measurement value in the memory 62 together with the time information. The data stored in the memory 62 may be used for analyzing a correlation between the thickness and the pressurization force of the secondary battery cell 10, and the changing behavior of the thickness and the pressurization force according to the measuring conditions.

According to another aspect, the controller 60 may control the heater 70 or the cooling means 80 to adjust the ambient temperature of the secondary battery cell 10 to a temperature set by the operator, with or without performing charging and discharging of the secondary battery cell 10. In this case, the controller 60 may determine a thickness measurement value of the secondary battery cell 10 and a measurement value of the pressurization force applied to the pressurizing plate 30, using the measurement means 51, 53 continuously or intermittently. Further, the controller 60 may store the thickness measurement value and the pressurization force measurement value in the memory 62 together with the time information. The data stored in the memory 62 may be used for analyzing a correlation between the thickness and the pressurization force of the secondary battery cell 10, and the changing behavior of the thickness and the pressurization force according to the measuring conditions.

According to the present disclosure, the thickness of the secondary battery cell 10 may be measured in a manner described below.

In one aspect, the thickness of the secondary battery cell 10 may be easily measured by using the measurement means 53 such as the piezoelectric sensor, and so on of the cell thickness measuring apparatus illustrated in FIG. 1. That is, the controller 60 may be inputted with a thickness measurement value of the secondary battery cell 10 from the measurement means 53 and determine the thickness of the secondary battery cell 10.

In another example, the thickness of the secondary battery cell 10 may be determined using the measurement means 51 only.

First, in a state that the secondary battery cell 10 is not positioned on the mounting stand 20, i.e., in a state that no force is exerted to the pressurizing plate 30 (i.e., elastic member 40), let the distance between the mounting stand 20 and the pressurizing plate 30 be t1, the distance between the pressurizing plate 30 and the driving block 42 be L0, and the sum (t0+L0) of these two distances be the initial position (H0) of the driving block 42. In this case, the initial position of the driving block 42 is set such that t0 is less than the initial thickness of the secondary battery cell 10. In one example, t0, L0 and H0 values corresponding to initial condition may be stored in the memory 62 in advance.

FIG. 2A shows the initial state in which the secondary battery cell 10 for thickness measurement is mounted on the mounting stand 20. Because the thickness of the secondary battery cell 10 is greater than t0, the elastic member 40 is slightly elastically biased as the pressurizing plate 30 is moved upward. Accordingly, the pressurizing plate 30 is in the state of pressurizing the secondary battery cell 10 with a predetermined pressurization force. In this state, the conditions L1<L0 and t1>t0 are met. Because the driving block 42 is not raised, but is in the initial position, H0=L0+t0=L1+t1. Accordingly, the thickness t1 of the secondary battery cell 10 in the state illustrated in FIG. 2A can be calculated from the relationship t1=H0−L1 or t1=L0−L1+t0. Here, H0, L0, t0 are known values stored in the memory 62. The controller 60 may determine a distance L1 between the driving block 42 and the pressurizing plate 30 using the measurement means 51 and then determine an initial thickness t1 of the secondary battery cell 10 with the equations described above using the determined distance L1, and H0, L0, t0 stored in the memory 62, and store the determined value in the memory 62.

The process of calculating t1 as described above may repeat continuously or intermittently during charging and discharging of the secondary battery cell 10 and/or while the temperature of the secondary battery cell 10 is being adjusted according to the conditions set by the operator.

Next, FIG. 2B illustrates when the thickness increases due to expansion of the secondary battery cell 10. The secondary battery cell 10 may expand when the number of charge/discharge cycles increases sufficiently or when the ambient temperature of the secondary battery cell 10 is maintained under high temperature for a long period of time.

Even in the state illustrated in FIG. 2B, the driving block 42 is still in the initial position H0. Accordingly, the thickness t2 of the secondary battery cell 10 is calculated from the relationship t2=H0−L2 or t2=L0−L2+t0, as in the state shown in FIG. 2A. Accordingly, the controller 60 may determine a distance L2 between the driving block 42 and the pressurizing plate 30 using the measurement means 51, and then determine an expanded thickness t2 of the secondary battery cell 10 with the equations described above using the determined distance L2, and H0, L0, t0 stored in the memory 62, and store the expanded thickness t2 in the memory 62.

The process of calculating t2 as described above may repeat continuously or intermittently during charging and discharging of the secondary battery cell 10 and/or while the temperature of the secondary battery cell 10 is being adjusted according to the conditions set by the operator.

Meanwhile, when the secondary battery cell is in use or in storage, as described above, the high-capacity module-type battery is restricted by the cartridge frame, or the small module-type battery mounted to a portable electronic apparatus is restricted by the external case. Accordingly, the thickness of the secondary battery cell 10 is not increased as much as t2. FIG. 2C illustrates such state simulated with the apparatus according to the present disclosure.

In order to simulate a situation in which the expansion of the secondary battery cell 10 is inhibited by the cartridge frame or the external case, the controller 60 may increase the pressurization force applied to the pressurizing plate 30 by lowering down the driving block 42 by ΔH. Because H0=L3+t3+ΔH, the thickness t3 of the secondary battery cell 10 can be calculated from the relationship t3=H0−L3−ΔH, where H0 is a known value stored in the memory 62, and ΔH is a value that can be determined based on the angle of rotation or number of rotations of the motor 46. The controller 60 may determine a distance L3 between the driving block 42 and the pressurizing plate 30 with the measurement means 51, determine ΔH with the angle of rotation, or number of rotations of the motor 46, and determine an expansion restriction thickness t3 of the secondary battery cell 10 with the determined distance L3 and ΔH, and H0 stored in the memory 62, by using the equation described above, and store the same in the memory 62.

The process of calculating the expansion restriction thickness t3 may repeat continuously or intermittently during charging and discharging of the secondary battery cell 10 according to the conditions set by the operator and/or while the temperature of the secondary battery cell 10 is being adjusted according to the conditions set by the operator.

Preferably, in the state of FIG. 2C, the controller 60 may control the motor 46 to change (i.e., increase) the pressurization force such that t3 calculated in real time is maintained almost identical to t1. By adjusting t3 identical to t0, it is possible to experimentally simulate a situation in which the secondary battery cell 10 is restricted from thickness expansion due to rigidity of the cartridge frame and the external case.

In such operation, the controller 60 may determine the magnitude of the pressurization force based on L3 calculated in real time with the measurement means 51, and the determined magnitude of pressurization force may be accumulatively stored in the memory 62 along with time information. In response to a request from the operator, the controller 60 may display the pressurization force change data or the thickness change data of the secondary battery cell 10 stored in the memory 62, through the display 100. The operator can then utilize the pressurization force change data in order to determine the strength data necessary when designing the cartridge frame or the external case of the module-type battery. Further, the controller 60 may maintain the progresses of the charge/discharge cycles or the high temperature state of the secondary battery cell 10 until the secondary battery cell 10 breaks, and then display the pressurization force change data or the thickness change data of the secondary battery cell 10 stored in the memory 62 until the breakage of the secondary battery cell 10 on the display 100. Accordingly, the operator can utilize the displayed pressurization force change data and thickness change data when designing the secondary battery cell 10.

Meanwhile, although FIGS. 2B and 2C exemplify measuring a cell thickness when the pressurization force is changed in an increasing pattern (L1<L2<3), the pressurization force may be maintained constant during cell thickness measurement. In such example, the controller 60 may raise the driving block 42 according to the increasing thickness of the cell such that the pressurization force is maintained constant (i.e., L1=L2). While the pressurization force is being maintained constant, the controller 60 may determine the thickness of the secondary battery cell 10 with the measurement means 51, 52 continuously or intermittently and store the determined thickness in the memory 62 along with the time information. Further, in response to a request from the operator, the controller 60 may display the thickness change data or the pressurization force change data of the secondary battery cell 10 stored in the memory 62, through the display 100. The operator may then observe the thickness change and behavior of the secondary battery cell as if the cell is in use or in storage, in a state that constant pressurization force is applied to the secondary battery cell 10.

As described above, while the related technology measures the thickness of the cell simply on an one-time basis in fixed condition (i.e., with fixed pressurization force), the present disclosure can easily set various pressurization forces (e.g., pressurization force exerted on each of the secondary battery cells of the module-type battery in the initial state of the secondary battery, pressurization force increased from initial state by the expansion of the secondary battery cell in the charge/discharge cycle, pressurization force exerted on the secondary battery cell when the secondary battery is left at high temperature or low temperature for long period of time, and so on) and measure the thickness. Accordingly, changes in the thickness and behavior of the secondary battery cell can be observed in the condition closer to the secondary battery cell being in actual use or in storage. Furthermore, it is possible to observe the behavior of the secondary battery cell being in actual use or in storage, by suppressing the change in the thickness of the secondary battery cell by adjusting the pressurization force. The thickness change data or the pressurization force change data of the secondary battery cell 10 stored in the memory 62 can be utilized for determining physical strength data necessary for the cartridge frame or external case, or the pouch.

In describing a variety of aspects of the present disclosure, the elements with names ending with 'unit' will have to be understood as the elements that are distinguished functionally, rather than being distinguished physically. Accordingly, the respective elements may be optionally incorporated with another element, or each of the elements may be divided into sub-elements such that the respective elements efficiently implement control logic(s). However, even when the elements are incorporated or divided, it will be obvious to those skilled in the art that the incorporated or divided elements also fall under the scope of the present disclosure, as long as the sameness of functions is acknowledged.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure can make various settings of a desired pressurization force or an ambient temperature with ease for the measurement of the cell thickness. Accordingly, the change in the thickness of the secondary battery cell and behavior thereof can be observed under a condition close to when the secondary battery cell is in actual use or in storage. Furthermore, while the change in the thickness of the secondary battery cell is suppressed, the behavior of the secondary battery cell, either when the secondary battery cell is in actual use or in storage, can be observed so that necessary physical strength data required for a cartridge frame or external case, or pouch can be obtained.

What is claimed is:

1. An apparatus for measuring a thickness of a secondary battery cell, comprising:
   a mounting stand on which a secondary battery cell for thickness measurement is positioned;
   a pressurizing plate opposing the mounting stand with the secondary battery cell being interposed therebetween, the pressurizing plate installed such that a distance to the mounting stand is variable;
   a pressurizing means configured to press the secondary battery cell positioned on the mounting stand in a thickness direction by pushing or pulling the pressurizing plate toward or from the mounting stand;
   a measurement means configured to measure a pressurization force applied to the pressurizing plate and the thickness of the secondary battery cell at time intervals; and
   a controller configured to: control charging, discharging or temperature of the secondary battery cell according to a measurement condition as inputted by an operator; be inputted with a pressurization force measurement value and a thickness measurement value from the measurement means at time intervals to determine a magnitude of the pressurization force applied to the pressurizing plate and the thickness of the secondary battery cell and store a determined data in a memory along with time information; and, while the thickness of the secondary battery cell is being measured, vary, or maintain a pressurization force applied to the pressurizing plate by the pressurizing means to be constant.

2. The apparatus of claim 1, wherein the pressurizing means comprises:
   an elastic member installed on one of both surfaces of the pressurizing plate, opposing a surface in contact with the secondary battery cell, so as to elastically bias the pressurizing plate;
   a driving block coupled with the elastic member to push or pull the elastic member in the thickness direction of the secondary battery cell; and
   a driving unit configured to raise or lower the driving block in the thickness direction of the secondary battery cell.

3. The apparatus of claim 2, wherein
   the measurement means is configured to measure a distance between the driving block and the pressurizing plate and output a distance measurement value as a pressurization force measurement value, at time intervals, and
   the controller is configured to: be inputted with the distance measurement value from the measurement means and determine a length of the elastic member; determine a magnitude of the pressurization force applied to the pressurizing plate based on the determined length of the elastic member; and store the determined magnitude of the pressurization force in a memory along with time information.

4. The apparatus of claim 3, wherein the controller is configured to display pressurization force change data or thickness change data of the secondary battery cell stored in the memory, through a display.

5. The apparatus of claim 3, wherein the controller is configured to determine the thickness of the secondary battery cell using the length of the elastic member, a moving distance of the driving block, and an initial distance between the mounting stand and the pressurizing plate, and store the determined thickness in a memory along with time information.

6. The apparatus of claim 5, wherein the controller is configured to display thickness change data or pressurization force change data of the secondary battery cell stored in the memory, through a display.

7. The apparatus of claim 3, wherein the measurement means comprises a distance measuring sensor configured to emit an optical signal, an ultrasound or an infrared ray from the driving block or the pressurizing plate to measure time taken for reciprocating between the driving block and the pressurizing plate and output a distance measurement value indicative of the distance between the driving block and the pressurizing plate.

8. The apparatus of claim 1, wherein the measurement means comprises a piezoelectric sensor disposed between a surface of the mounting stand and a surface of the pressurizing plate opposing the surface of the mounting stand and configured to output a thickness measurement value of the secondary battery cell.

9. The apparatus of claim 1, further comprising a charger/discharger configured to charge or discharge the secondary battery cell, wherein the controller is inputted with a charging and discharging condition from the operator and store the inputted condition in the memory, and control the charger/discharger according to the charging and discharging condition such that the secondary battery cell is charged and discharged.

10. The apparatus of claim 1, further comprising a heater installed on at least one of the pressurizing plate and the mounting stand, wherein the controller is inputted with a heating temperature set value from the operator and store the inputted data in the memory, and control a temperature of the heater according to the heating temperature set value.

11. The apparatus of claim 1, further comprising a cooling means for cooling at least one of the pressurizing plate and the mounting stand, wherein the controller is inputted with a cooling temperature set value from the operator and store the inputted data in the memory, and control the cooling means according to the cooling temperature set value.

12. A method for measuring a thickness of a secondary battery cell using: a mounting stand on which a secondary battery cell for thickness measurement is positioned; a pressurizing plate installed such that a distance to the mounting stand is variable, with the secondary battery cell being interposed therebetween, the pressurizing plate being elastically biased by an elastic member; a driving block configured to press the secondary battery cell positioned on the mounting stand in a thickness direction by pushing or pulling, with the elastic member, the pressurizing plate toward or from the mounting stand; a measurement means configured to measure a pressurization force applied to the pressurizing plate and the thickness of the secondary battery cell; and a controller, wherein the method comprises:

(a) charging or discharging the secondary battery cell or adjusting a temperature of the secondary battery cell according to a measurement condition inputted by an operator;

(b) at time intervals, being inputted with a pressurization force measurement value and a thickness measurement value from the measurement means, determining a magnitude of the pressurization force applied to the pressurizing plate and the thickness of the secondary battery cell, and storing the magnitude of the pressurization force and the thickness in a memory along with time information; and (c) while the thickness of the secondary battery cell is being measured, varying, or maintaining a pressurization force applied to the pressurizing plate by the pressurizing means to be constant.

13. The method of claim 12, comprising:

being inputted with a distance measurement value as a pressurization force measurement value from the measurement means at time intervals;

determining a length of the elastic member based on the distance measurement value;

determining a magnitude of the pressurization force applied to the pressurizing plate based on the determined length of the elastic member;

storing the determined pressurization force in the memory along with time information; and displaying, through a display, the stored pressurization force change data.

14. The method of claim 13, comprising:

determining the thickness of the secondary battery cell using the length of the elastic member, a moving distance of the driving block, and an initial distance between the mounting stand and the pressurizing plate, and storing the determined thickness in the memory along with time information; and displaying, through a display, the thickness change data of the secondary battery cell stored in the memory.

15. The method of claim 12, comprising:

being inputted with a charging and discharging condition from an operator;

while the thickness of the secondary battery cell is being measured, charging and discharging the secondary battery cell according to the charging and discharging condition; and displaying, through a display, a thickness change data of the secondary battery cell according to the magnitude of a pressurization force or the pressurization force change data according to the thickness of the secondary battery cell.

16. The method of claim 12, comprising:

being inputted with heating temperature set value from an operator;

while the thickness of the secondary battery cell is being measured, heating the secondary battery cell with a heater installed on at least one of the pressurizing plate and the mounting stand such that the temperature of the secondary battery cell corresponds to the heating temperature set value; and displaying, through a display, a thickness change data of the secondary battery cell according to the magnitude of the pressurization force or a pressurization force change data according to the thickness of the secondary battery cell.

17. The method of claim 12, comprising:

being inputted with a cooling temperature set value from an operator;

while the thickness of the secondary battery cell is being measured, cooling the secondary battery cell with a cooling means installed on at least one of the pressurizing plate and the mounting stand such that the temperature of the secondary battery cell corresponds to the heating temperature set value; and displaying, through a display, a thickness change data of the secondary battery cell according to the magnitude of a pressurization force or the pressurization force change data according to the thickness of the secondary battery cell.

* * * * *